United States Patent [19]

Kanemitsu

[11] Patent Number: 5,940,803
[45] Date of Patent: Aug. 17, 1999

[54] ITINERARY MAKING SYSTEM

[75] Inventor: Hiroyuki Kanemitsu, Susono, Japan

[73] Assignee: Toyota Jidosha Kabushiki Kaisha, Toyota, Japan

[21] Appl. No.: 08/789,615

[22] Filed: Jan. 27, 1997

[30] Foreign Application Priority Data

Jan. 31, 1996 [JP] Japan .................................. 8-016241

[51] Int. Cl.$^6$ ...................................................... G06F 15/26
[52] U.S. Cl. ........................ 705/6; 705/6; 705/5; 701/201
[58] Field of Search ............................ 705/5, 6; 701/201

[56] References Cited

U.S. PATENT DOCUMENTS

| | | | |
|---|---|---|---|
| 4,796,189 | 1/1989 | Nakayama et al. | 701/209 |
| 4,926,336 | 5/1990 | Yamada | 701/202 |
| 5,031,104 | 7/1991 | Ikeda et al. | 701/209 |
| 5,231,584 | 7/1993 | Nimura et al. | 701/202 |
| 5,237,499 | 8/1993 | Garback | 705/5 |
| 5,272,638 | 12/1993 | Martin et al. | 701/202 |
| 5,331,546 | 7/1994 | Webber et al. | 705/6 |
| 5,353,034 | 10/1994 | Sato et al. | 342/457 |
| 5,377,113 | 12/1994 | Shibazaki et al. | 701/209 |
| 5,559,707 | 9/1996 | Delorme et al. | 701/200 |
| 5,568,390 | 10/1996 | Hirota et al. | 701/201 |

FOREIGN PATENT DOCUMENTS

| | | |
|---|---|---|
| 0532158 | 3/1993 | European Pat. Off. . |
| 0567992 | 11/1993 | European Pat. Off. . |
| 0638887 | 2/1995 | European Pat. Off. . |
| 0660289 | 6/1995 | European Pat. Off. . |
| 0669586 | 8/1995 | European Pat. Off. . |
| 4-213761 | 8/1992 | Japan . |
| 5-313583 | 11/1993 | Japan . |
| 7-055484 | 3/1995 | Japan . |

OTHER PUBLICATIONS

Tripmaker 1996 Edition(TM) Shifts Trip Planning into High Gear with Multimedia Features, Newswire; Sep. 14, 1995.
Robotics, CIM and Automation, Emerging Technologies, San Diego, Nov. 9–13, 1992, vol. 2 of 3, Nov. 9, 1992, Institute of Electrical and Electronics Engineers, pp. 902–906, Abe K et al: "A Planning Method Combining Rule–Bases and Optimization Algorithms For Transportation Network" p. 902, left–hand col., line 1—p. 903, right–hand col., line 16:figure 2.
Management Science, vol. 25, No. 12, Dec. 1979, USA, pp. 1197–1207, Zoltners A.A. et al.: "An Optimal Algorithm for Sales Representative Time Management" p. 1198, line 7—p. 1199, line 39.
IBM Technical Disclosure Bulletin, vol. 37, No. 4A, Apr. 1, 1994, p. 567 Entertainment Guide Enabling:.
Proceedings of the Vehicle Navigation and Information Systems Conference, Oslo, Sep. 2–4, 1992, No. Conf. 3, Sep. 2, 1992, Olaussen L; Helli E, pp. 14–19, Anagnostopoulos P et al: "Pan–Drive: A Vehicle Navigation and Rout Guidance System" p. 15, line 27 –line 41, p. 14, line 1 –line 8.

(List continued on next page.)

*Primary Examiner*—Allen R. MacDonald
*Assistant Examiner*—Jagdish Patel
*Attorney, Agent, or Firm*—Pillsbury Madison & Sutro LLP

[57] ABSTRACT

An itinerary making system for preparing an itinerary according which facilities can be used timely, by a simple inputting operation. When a traveler enters desired facility information and visiting purposes through an input unit, a plan preparing unit retrieves from a database a recommended route for arriving at the subject facilities and recommended visiting times for using the facilities according to each visiting purpose. A plan preparing unit prepares a time schedule based on the retrieved recommended visiting time, prepares an itinerary according to which a traveler can arrive at desired facilities at an appropriate time, and shows the itinerary on a display.

17 Claims, 12 Drawing Sheets

OTHER PUBLICATIONS

Patent Abstracts of Japan, vol. 96, No. 7, Jul. 31, 1996 & JP 08 075493 A, Mar. 22, 1996.

Robotics, CIM and Automation, Emerging Technologies, San Diego, Nov. 9–13, 1992, vol. 2 of 3, Nov. 9, 1992, Institute of Electrical and Electronics Engineers, pp. 902–906, Abe K et al: "A Planning Method Combining Rule–Bases and Optimization Algorithms For Transportation Network".

Patent Abstracts of Japan, vol. 96, No. 005, May 31, 1996 & JP 08 022595 A (Alpine Electron Inc), Jan. 23, 1996.

Proceedings of the International Conference on Genetic Algorithms, University of Illinois, Urbana–Champaign, Jul. 17–21, 1993, No. Conf. 5, Jul. 17, 1993, Forrest S. pp. 506–513, Thangiah S R et al: "Vehicle Routing With Time Deadlines Using Genetic and Local Algorithms" p. 507, left–hand col., line 24–p. 507, left–hand col., line 7.

IBM Technical Disclosure Bulletin, vol. 38, No. 4, Apr. 1, 1995, pp. 501–503, "Multi–Product Delivery System Optimization Procedure".

Patent Abstracts of Japan, vol. 96, No. 001, May 31, 1996 & JP 08 005391 A, Jan. 12, 1996.

Patent Abstracts of Japan, vol. 012, No. 300 (P–745), Aug. 16, 1988 & JP 63 073371 A, Apr. 2, 1988.

Kato et al: "System for Providing Recommended Routes in Sightseeing Spots by Using Fuzzy Theory", Information Processing Society of Japan, Lecture Transactions (III) from the 40th General Convention, Mar. 14 to 16, 1990, pp. 1572–1573; see English Abstract.

Kato et al: "Basic Examination on System for Planning Domestic Tourism Program", Information Processing Society of Japan, Lecture Transactions (I) from the 41st General Convention, Sep. 4 to 6, 1990, pp. 265–266; see English Abstract.

Suzuki et al: "A Travel Consultation System: Towards a Smooth Conversation in Japanese", Lecture Notes In Computer Science, vol. 221, 1986, pp. 226–235.

U.S. application No. 08/750,641, Sato et al.

U.S. application No. 08/786,042, Kanemitsu.

U.S. application No. 08/785,985, Morita.

Fig. 3A

FACILITY NAMES | BACK
TOUCH A DESIRED □.

| AMUSEMENT PARK | SKI SLOPE | PARK |
| ZOO/BOTANICAL GARDEN | HOT SPRING | CAMPSITE |
| SIGHTS/CASTLES | ART MUSEUM/MUSEUM | SHRINE/TEMPLE |

◁ PREVIOUS    PAGE 1/3    NEXT ▷

Fig. 3B

FACILITY NAMES | BACK
TOUCH A DESIRED □.

| STATION | PUBLIC OFFICE | POLICE |
| AIRPORT/PORT | CROSSING | IC. SA. PA |
| HOTEL | DEPARTMENT STORE | HALL |

◁ PREVIOUS    PAGE 2/3    NEXT ▷

Fig. 3F

PURPOSES | BACK
SELECT A PURPOSE OF GOING.
REST | MEAL | LEISURE
STAY | DROPPING-IN | GOLF
GAME WATCHING | NIGHT VIEW WATCHING | DATE

Fig. 3E

AMUSEMENT PARKS | BACK
TOUCH A DESIRED □.
PREVIOUS | Ⓐ WW AMUSEMENT PARK
JAPANSE SYLLABARY | □
JAPANSE SYLLABARY | □
NEXT | □

ITINERARY MAKING SYSTEM

BACKGROUND OF THE INVENTION

1. Field of the Invention

The invention relates to an itinerary making system, and particularly to an itinerary making system for making an itinerary according to which a traveler can conveniently arrive at desired sites which are input by the traveler.

2. Description of the Related Art

Navigation systems have become popular in recent years. Navigation systems can show on its map information the present position, a destination, and a recommended travelling route from the present position to the destination. Also, necessary information can be acquired by accessing a database through an in-car terminal or a transportable terminal. There have been proposed communications systems which can receive an optimum travelling route for a vehicle with traffic jam information taken into account and also guide information on recreation facilities and restaurants.

For example, the navigation system disclosed in Japanese Patent Laid-Open Publication No. Hei 5-313583 provides the shortest route to efficiently visit a plurality of destinations, the addresses of which are entered by a traveler (a package deliveryman).

Further, a proposal has been made for an itinerary making system which is used together with the above-described navigation system to make an itinerary including a desired destination before setting out on a journey. This itinerary making system can calculate a required time to reach the destination through a recommended route in view of a traveling distance to reach the destination and traffic history information on the recommended route, incorporate a travel time schedule into the itinerary, and update the itinerary in correspondence with the actual traveling.

However, since the itinerary making system which is used together with the conventional navigation system shows the shortest route to efficiently arrive at the input destinations, it has a disadvantage that a traveler cannot timely arrive at the prescribed destinations as he or she desires. For example, assume that a traveler, who wants to play in an amusement park and to see the sun setting over the sea, inputs XX Amusement Park and YY Beach Observation Platform as destinations (visiting facilities). In this case, an itinerary might be made to visit the observation platform in the morning or to go to the amusement park after its closing time depending on the positional relationship between the amusement park and the observation platform. This itinerary is meaningless.

To remedy such a disadvantage, desired visiting times may also be entered when the facilities to be visited are entered. However, the input of the visiting time for respective facilities makes the input operation troublesome, and appropriate visiting times may not be entered easily. For example, the opening time of some facilities may be different depending on the day of the week or a season, and the time when the sun sets over the sea is different depending on the time and date or place. Therefore, various kinds of information are required to designate the appropriate visiting time. As a result, the optimum time cannot be acquired easily and the itinerary cannot be made efficiently.

SUMMARY OF THE INVENTION

The invention has been completed in view of the above disadvantages, and aims to provide an itinerary making system with which an itinerary for enabling use of facilities timely can be prepared by a simple inputting operation.

To achieve the above object, a system for preparing an itinerary according to inputted information comprises input means for entering facility information including purposes of visiting facilities, time storage means for storing a recommended visiting time for each purpose of visiting the facilities, retrieval means for retrieving the recommended visiting time which corresponds to the entered visiting purpose, and plan making means for preparing an itinerary according to the retrieved recommended visiting time.

The facilities used here include the destination of a journey and spots where a traveler stops on the way to the destination, and indicate specific buildings and scenic spots without any building. The visiting purpose is to use the above facilities, to play baseball or to see a game when the facilities are a baseball stadium, or to have a rest or to enjoy the beauty of the scenery when the facilities are an observation platform. The recommended visiting time means a time when it is preferable to arrive at pertinent facilities to favorably achieve the visiting purpose. When the visiting facilities are an art museum and the visiting purpose is to view art, the recommended visiting time is for example, 2:00 p.m., when visitors are minimum and a traveler can visit the art museum to view art at the traveler's leisure while the art museum is open. Further, when the facilities are an observation platform and the visiting purpose is to enjoy the sunset, the recommended visiting time is a time which is obtained with reference to the location of the observation platform and the sunset time of a traveling day, for example, 30 minutes before 6:15 p.m., namely 5:45 p.m. when the sun starts to set.

According to the above configuration, an itinerary is prepared based on the recommended visiting time which is optimum for the visiting purpose, so that an itinerary according to which the facilities can be used at an optimum time can be prepared by a simple inputting operation.

Also, an itinerary making system according to the invention comprises category storage means for storing facilities in the form classified according to categories, input means for entering facility information containing the categories of the facilities, assuming means for assuming a visiting purpose according to the category entered, time storage means for storing a recommended visiting time corresponding to the visiting purpose, retrieval means for retrieving the recommended visiting time which corresponds to the assumed visiting purpose, and plan making means for preparing an itinerary according to the retrieved recommended visiting time.

The classification according to categories is for visiting facilities, and is indicated by simple type names such as "eating spot", "leisure facilities" and "sightseeing spot". Therefore, when "leisure facilities" is entered as the category, the assuming means assumes that the visiting purpose is to play in an amusement park or a park.

According to the above configuration, the travelling purpose intended by a traveler is assumed when a category is simply entered, and an itinerary is prepared based on the recommended visiting time optimum for the visiting purpose. Thus, an itinerary, according to which facilities can be used when it is optimum, can be prepared by a simple entering operation.

When a plural pieces of facility information are entered, the plan making means in the itinerary making system of the present invention determines the order of visiting the facilities according to the recommended visiting time retrieved for each piece of facility information, and prepares an itinerary.

According to the above configuration, even when a traveler wants to visit a plurality of facilities, an itinerary according to which the traveler can visit the facilities at appropriate times can be prepared.

The itinerary making system according to the invention is further provided with information acquiring means for obtaining predetermined additional information, and the purpose assuming means assumes a visiting purpose with reference to the additional information.

The predetermined additional information is determined independent of the facility information entered by a traveler and includes event information and information showing the relationship between the traveler and the facilities, according to which a facility visiting purpose can be specified.

According to the above configuration, the visiting purpose is assumed based on the additional information in addition to the category, so that the visiting purpose can be assumed with higher reliability and a satisfactory itinerary can be prepared.

In the itinerary making system according to the invention, the additional information is reservation information for keeping facilities to be visited for future use.

The reservation information specifically determines the purpose of use of a facility and times of use, and includes a course reservation for a golf course, an admission reservation for a concert or a game, a restaurant reservation or the like.

According to the above configuration, a facility visiting purpose can be assumed easily and correctly based on the reservation information including purpose of use of a facility and times of use, so that a satisfactory itinerary can be prepared.

The itinerary making system according to the invention is further provided with priority determining means for determining a priority of visiting the facilities to be visited according to the entered order of the facilities, wherein the plan making means prepares an itinerary on the basis of facilities with high priority.

According to the above configuration, a itinerary can be prepared based on the facilities which a traveler wants to visit most. For example, the itinerary can be based on the recommended visiting time of the facilities which are entered first, so that the traveler can make sure of visiting the facilities which they want to visit most.

The itinerary making system according to the invention is further provided with pertinent facility storage means for storing recommended facilities to be visited related to the facilities to be visited and recommended visiting times thereof. Thus the plan making means prepares an itinerary which includes the recommended facilities to be visited corresponding to the entered facility information.

The recommended facilities to be visited include the neighborhood of desired facilities to be visited, and/or places of natural beauty and historic interest or popular spots on the way to or on the way back from the facilities to be visited.

According to the above configuration, the facilities can be visited at an optimum time, and a more beneficial itinerary can be prepared easily.

The itinerary making system according to the invention is further provided with an output for outputting the prepared itinerary.

The itinerary may be shown on a display or printed on paper by a printer.

The itinerary making system according to the invention is further provided with adoption/rejection input means for entering adoption (i.e., acceptance) or rejection of the prepared itinerary, and recommendation changing means for changing the recommendation information provided at the time of preparing an itinerary according to adoption or rejection.

The recommendation information includes the above-described recommended visiting time and recommended facilities to be visited.

According to the above configuration, information suitable for a traveler can be provided quickly, and an itinerary according to which desired facilities can be visited timely can be prepared easily.

Further, to achieve the above object, there is provided a program storage device readable by a machine, tangibly embodying a program of instructions executed by the machine to perform method steps for making an itinerary, said method steps comprising steps of:

1) receiving facility information including a facility and a visiting purpose regarding the facility;

2) retrieving a recommended visiting time corresponding to said visiting purpose from a database which stores a recommended visiting time for each visiting purpose of the facility; and 3) making an itinerary for visiting the facility according to the retrieved recommended visiting time.

Still further, to achieve the above object, there is provided a program storage device readable by a machine, tangibly embodying a program of instructions executed by the machine to perform method steps for making an itinerary, said method steps comprising steps of:

1) receiving facility information including a facility and a category designated to the facility;

2) assuming a visiting purpose of the facility according to the category;

3) retrieving a recommended visiting time corresponding to said visiting purpose from a database which stores a recommended visiting time for each visiting purpose of the facility; and 4) making an itinerary for visiting the facility according to the retrieved recommended visiting time.

The storage device includes, for example, a magnetic disc, magnetic tape, RAM, flash memory, optical disc, DVD, and so on, as well as a CD-ROM and a floppy disc. The storage device also includes a RAM which stores the program received from an outside service center via a communication line and is used to perform an itinerary preparing operation.

According to the above configuration, the program stored in the storage device can be executed by a personal computer or the like. Thus, it is possible to easily prepare an itinerary according to which the traveller can visit the facilities at optimum time points, by using an existing hardware.

BRIEF DESCRIPTION OF THE DRAWINGS

FIG. 3A is an example of the display screen of a facility list in the embodiments according to the invention.

FIG. 3B is an example of the display screen of a facility list in the embodiments according to the invention.

FIG. 3E is an example of the display screen of a facility list in the embodiments according to the invention.

FIG. 3F is an example of the display screen of a purpose list in the embodiments according to the invention.

DETAILED DESCRIPTION OF THE PREFERRED EMBODIMENTS

Preferred embodiments of the invention will be described with reference to the accompanying drawings.

Figure 1:
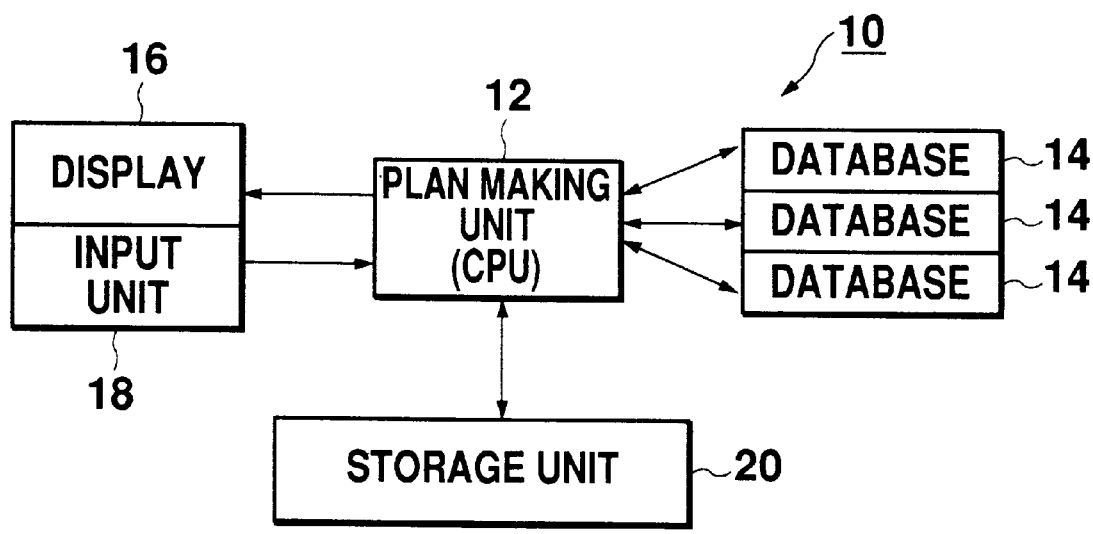
FIG. 1 is a block diagram showing a structure of the itinerary making system in the embodiments according to the invention.

FIG. 1 shows a block diagram of the basic structure of an itinerary making system 10 in the preferred embodiments. In the itinerary making system 10, a plan making unit (CPU) 12 for actually making an itinerary includes a route calculating unit, a retrieving unit for retrieving data, a purpose assuming unit for assuming a purpose of visiting facilities, a priority determining unit for determining a priority order of visiting facilities, an information acquiring unit for acquiring additional information on visiting facilities, and a recommendation changing unit (learning function unit) for suitably changing information recommended by the itinerary making system 10 in accordance with the interest of a traveler. Further, the retrieving unit is connected by wires or wirelessly to an internal database 14a or an external database 14b of the itinerary making system 10. The databases 14a, 14b have information on recommended visiting times of respective facilities and recommended visiting facilities related to particular facilities in addition to map information, facility guide information, reservation information, traffic information and the like. Also, respective pieces of information are classified according to districts where facilities are located, classified according to categories, or classified according to recommended visiting times within the databases 14a, 14b.

The plan making unit 12 is connected to a display 16 for showing a prepared itinerary, an operation process or the like, and to an input unit 8 which is provided integrally with or independently of the display 16. When the display 16 is integral with the input unit 18, touch switches are provided on the display 16 for example. When the display 16 is independent of the input unit 18, a keyboard and a mouse are provided. Besides, the plan making unit 12 is connected to a storage unit 20 which stores intrinsic data related to the preparation of an itinerary. The storage unit 20 includes a storage section for storing data related to the past itineraries in addition to a basic staying time storage section for storing basic staying times for respective facilities to be described afterwards, and a supplement item storage section for storing supplement items to make an itinerary substantial.

The itinerary making system 10 in the embodiments has optimum time to visit facilities, or recommended visiting times, for each purpose of visiting the facilities kept in the databases 14a, 14b and prepares an itinerary so that a traveler can timely visit desired facilities according to the recommended visiting time.

A procedure for making the itinerary will be described with reference to FIG. 1 and the flowchart illustrated in FIG. 2.

As described above, the databases 14a, 14b have information on facilities providing various services in addition to map information and traffic history information. The facilities include, for example, restaurants, amusement parks, museums, stadiums and theaters, and additionally include scenic spots such as observation platforms and beaches where no specific building is located. The above information further includes location information on where the above facilities are located and also the details of services and the past and current states of use as facility information. The databases 14a, 14b have recommended visiting times determined to correspond to the facility information. The recommended visiting time shows an optimum time of visiting the facilities according to the purpose of visiting the facilities. For example, the optimum time to see the exhibits in a museum is, for example, 2:00 p.m. when there are not too many visitors and a traveler can view at their leisure. The optimum time to have dinner in a restaurant is, for example, 8:30 p.m. when the restaurant atmosphere is preferable and sufficient service is provided in view of the number of customers. Also, the optimum time to see a night view from an observation platform or a beach may be 8:00 p.m. after sunset. The optimum time to see Mt. Fuji is the evening when it looks beautiful. When the start time is designated to permit the user to watch a game or see a play in a stadium or a theater, the recommended visiting time is a prescribed time, for example, 30 minutes before the start time. This recommended visiting time may be kept in combination with other information on the facilities, or kept in a separate database and corresponded there to according to the facility information.

Embodiment 1

Figure 2:
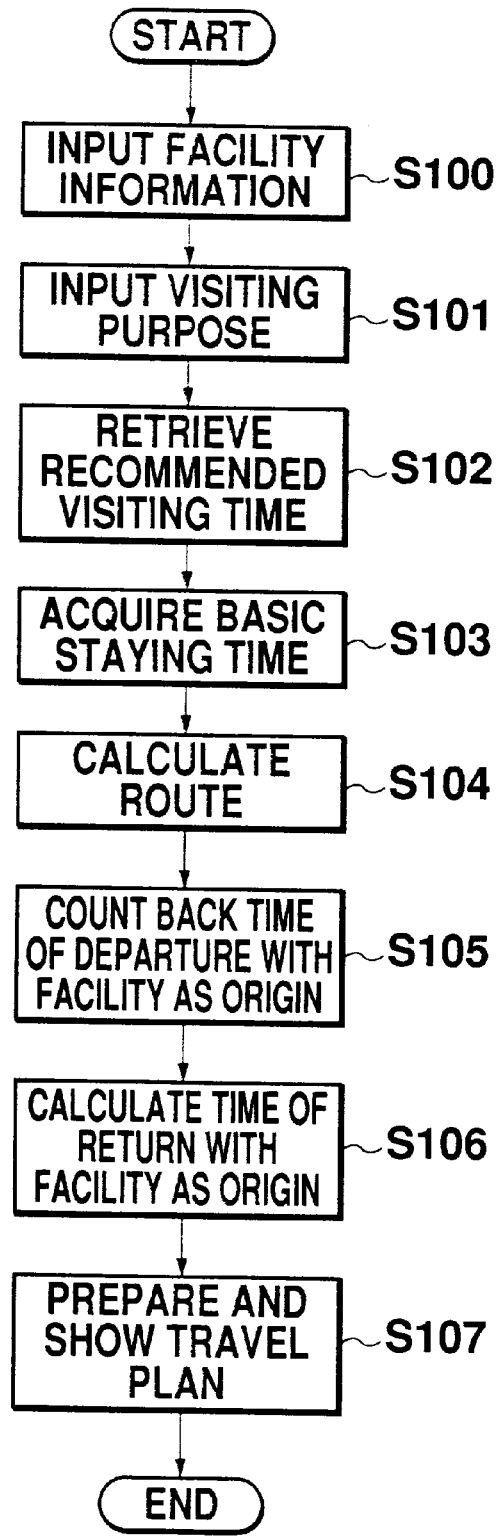
FIG. 2 is a flowchart for explaining the process of making an itinerary with desired facilities to be visited at a single location by the itinerary making system in the embodiments according to the invention.

The flowchart shown in FIG. 2 is used to explain the simplest example with visiting facilities at a single location. First, a traveler enters information on desired visiting facilities through the input unit 18 (S100). The simplest way of specifying the visiting facilities is to select one from the facility list shown on the display 16. Another method may specify the facilities by entering the specific name and address or by pointing to a desired point on the map shown on the display 16. At the same time, a traveling date, a place of departure, and a place of return are entered. Then, the purpose of visiting the entered facilities is entered (S101). The simplest way of entering a visiting purpose is to select one from the purpose list shown on the display 16 but the visiting purpose may be entered directly.

Figure 3D:
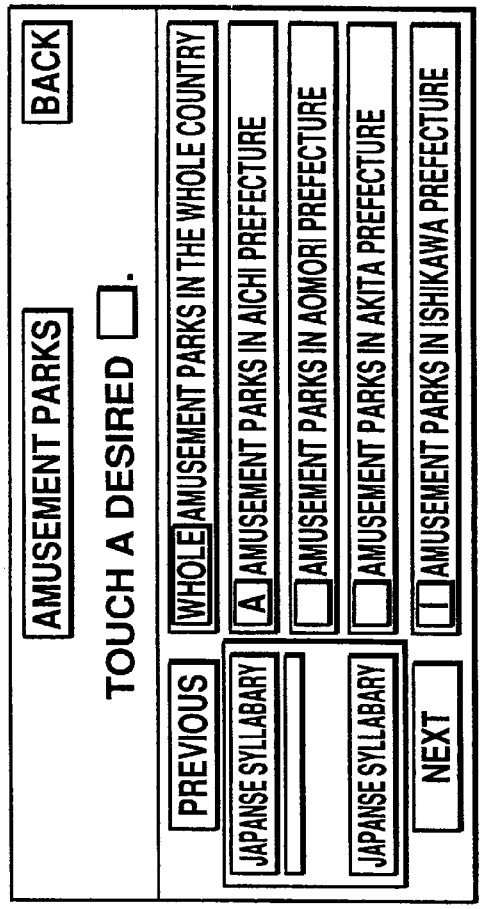
FIG. 3D is an example of the display screen of a facility list in the embodiments according to the invention.
Figure 3C:
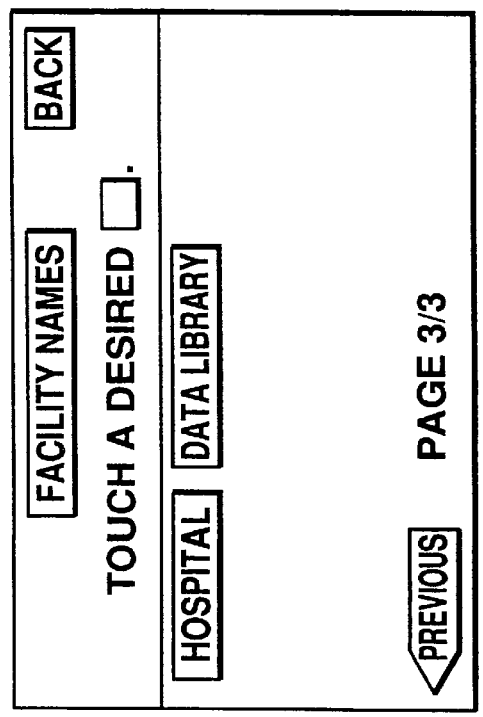
FIG. 3C is an example of the display screen of a facility list in the embodiments according to the invention.

FIG. 3A to FIG. 3E show examples of displayed facility lists. In FIG. 3A to FIG. 3E, the facility list has multiple pages, and the pages are turned in order of FIG. 3A→FIG. 3B→FIG. 3C by pressing "Next". When "Previous" is pressed, the pages are turned backward in order of FIG. 3C→FIG. 3B→FIG. 3A. By selecting "Amusement Park" from the facility list and pressing it, the facility list of amusement parks is displayed as shown in FIG. 3D. When "Whole Country" is selected from the facility list shown in FIG. 3D, the specific names of amusement parks in the country are displayed as shown in FIG. 3E, and a desired amusement park can be selected to enter facility information. FIG. 3F shows an example of the displayed purpose list. An item corresponding to a desired purpose is selected to enter the visiting purpose.

When the facility information and the visiting purpose are entered, the retrieving unit contained in the plan making unit 12 retrieves recommended visiting times corresponding to the pertinent facilities and visiting purpose from a database 14 (S102). For example, when the entered facilities are "XX Art Museum" and the visiting purpose is "Appreciation", the retrieving section refers to the database having information on art museums to obtain the pertinent art museum and recommended visiting time. The recommended visiting time is determined in view of the past data on visitation, for example, a time when there are not so many visitors so that a traveler can enjoy the exhibitions at their leisure.

When the retrieval of the recommended visiting time is completed, the plan making unit 12 obtains the basic staying time in respective facilities stored in the storage unit 20 (S103). The basic staying time is determined with reference to the past travel record of the traveler. The basic staying time is predetermined, for example, to be three hours when a traveler goes to an art museum for appreciation, five hours when a traveler goes to an amusement park to play, and 2.5 hours when a traveler goes to a restaurant to have dinner. The basic staying time can be changed as necessary.

Then, the plan making unit 12 calculates an optimum traveling route on the basis of the entered place of departure, visiting facilities and place of return (S104). The itinerary is calculated by the route calculating unit in the plan making unit 12 on the basis of the map information and road traffic history information in the database 14. Then, the starting time is calculated on the basis of the recommended visiting time for the visiting facilities (S105). The time of departure is specified by calculating the required time from the place of departure to the visiting facilities based on the distance information and traffic history information obtained from the map information in the database 14. Similarly, the time of return is specified by calculating the necessary time from the facilities to the place of return based on the time of ending a stay at the visiting facilities (S106). Thus, an itinerary from the start to the return is completely prepared and shown on the display 16 (S107). The itinerary may be shown in the form of a table which shows the position and time in time sequence or may indicate the time of departure and the visiting time as well as the traveling route on the map. Further, as to the visiting facilities, the provided service details and advertising information may be shown separately. The prepared itinerary may be shown on the display and printed by a printer.

Thus, since the recommended visiting time suitable for the visiting purpose to the visiting facilities is provided and the itinerary is prepared based on the recommended visiting time, the itinerary according to which a traveler can use the facilities at an optimum time can be prepared easily.

Embodiment 2

Figure 4B:
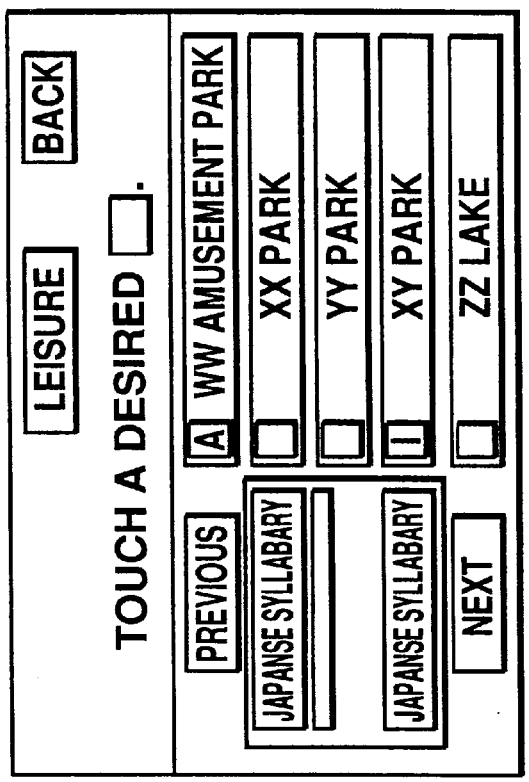
FIG. 4B is an example of the display screen of a facility list in the embodiments according to the invention.
Figure 4A:
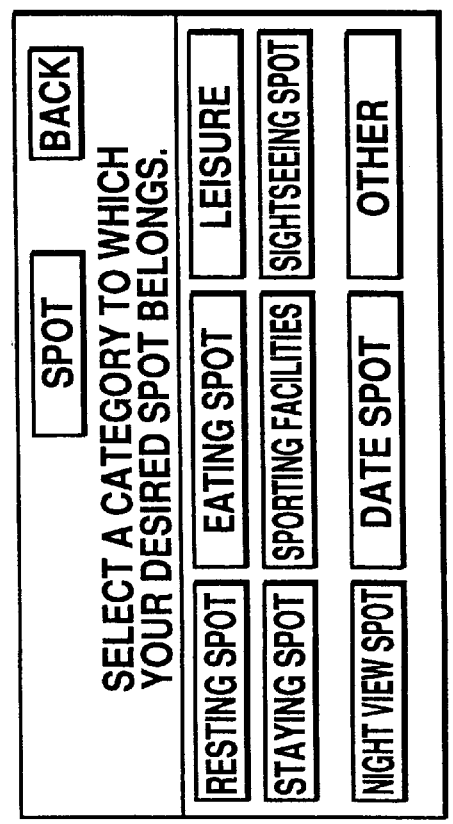
FIG. 4A is an example of the display screen of categories in the embodiments according to the invention.

Referring to FIG. 2, description was made of an example of retrieving the recommended visiting time by entering the facilities and the specific visiting purpose. In Embodiment 2, in the process of classifying facilities according to categories and limiting to the desired facilities among many facilities, a visiting purpose can be assumed in view of the categories. For example, respective facilities are classified into "Eating spot", "Leisure facilities", "Sightseeing spot" and others and kept in the database 14 as shown in FIG. 4A. For example, the facilities belonging to the category "Leisure facilities" include WW Amusement Park, XX Park, YY Park, ZZ Lake and others as shown in FIG. 4B. When a traveler selects the category "Leisure facilities" and then selects "ZZ Lake" from the facilities contained therein, a purpose assuming section (not shown) contained in the plan making unit 12 assumes that the purpose of visiting ZZ Lake is not to have a meal but to spend leisure time fishing and playing in the lake, and retrieves the recommended visiting time corresponding to the visiting purpose. In other words, even when the facilities are the same, an early time (e.g., 9:00 a.m.) in the morning is recommended as the visiting time when the category is leisure facilities and playing is the purpose as described above. On the other hand, when the category is eating spots and the purpose is to have lunch at a lakeside where scenery is beautiful, a time (e.g., 1:00 p.m.) around noon is recommended as the visiting time.

By the simple entry of a category, the traveling purpose intended by a traveler is assumed and an itinerary can be prepared based on the recommended visiting time optimum for the visiting purpose. Thus, the itinerary according to which the traveler can use the facilities at an optimum time can be prepared by the simple entry operation.

The categories may be classified according to types of facilities such as "stations", "golf courses" and "theaters", so that a visiting purpose can be assumed with reference to the type name which is used as a keyword by a traveler to focus on desired facilities among very many facilities.

Embodiment 3

Figure 5:
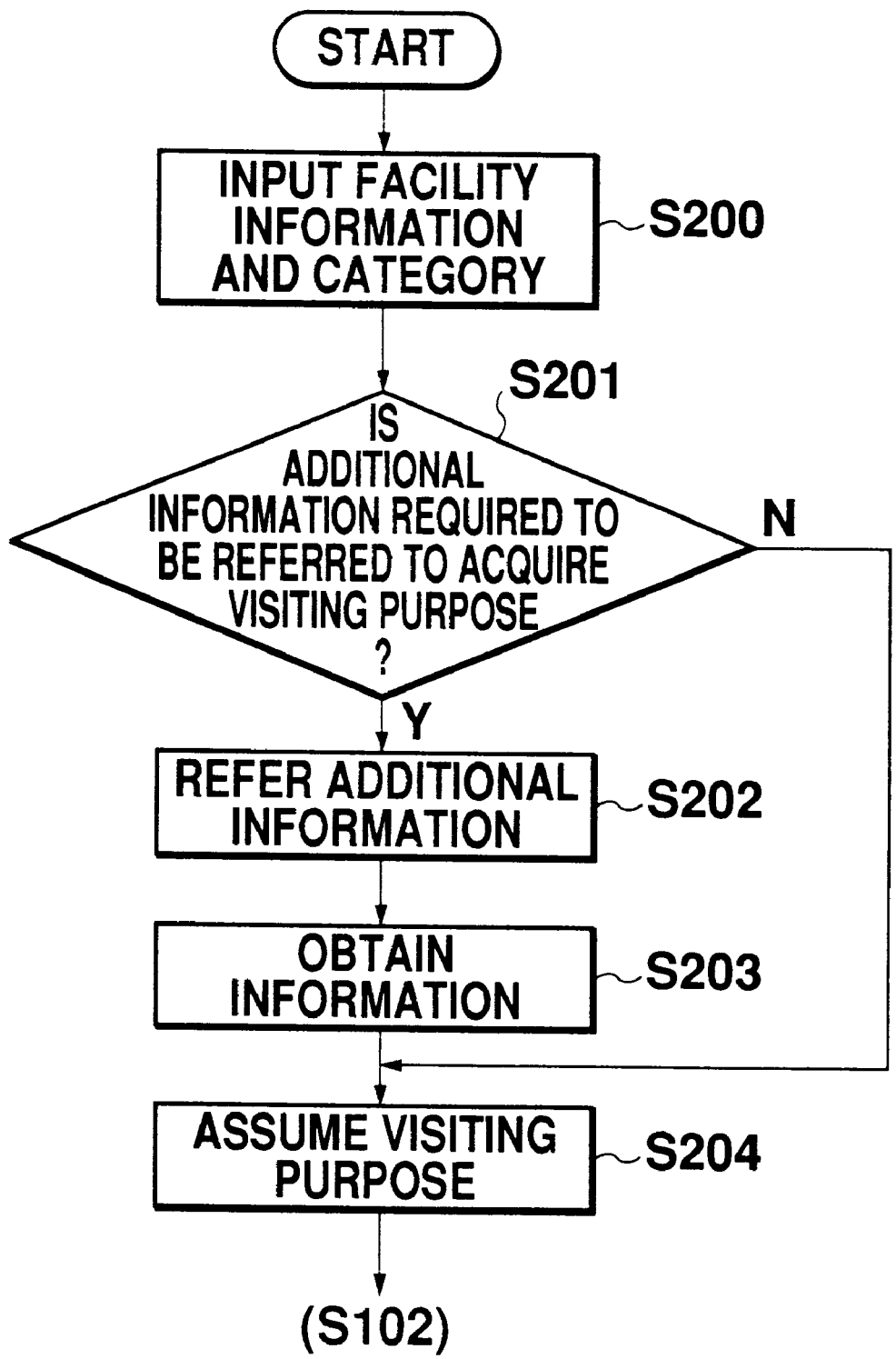
FIG. 5 is a partial flowchart for explaining the assumption of a visiting purpose with reference to additional information in the embodiments according to the invention.

Referring to the screen examples of FIG. 4A and FIG. 4B, description was made of the case of assuming a visiting purpose based on the category. Further, to estimate with higher reliability, another database can further be referred to. As shown in the flowchart of FIG. 5, when the category "Golf course" is selected and the facilities "KK Golf Course" contained therein are selected (S200), the information provided may not be sufficient to assume the visiting purpose. For example, it is hard to judge whether a traveler is going to KK Golf Course to play golf, to see a golf tournament, or to meet someone, and an appropriate visiting purpose may not be assumed. Therefore, when the category is input, the plan making unit 12 judges whether or not it is necessary to refer to the additional information on the facilities kept in the database 14 (S201). The additional information includes, for example, facility use reservation information and event information. Since the additional information has specific contents (purposes) and start times thereof, a visiting purpose can be specified. To use the reservation information, it is necessary to judge whether or not the traveler has made a reservation. If it is decided to use a particular identification number when a reservation is made by the traveler, the reservation information can be referred securely. When it is judged necessary to refer to the additional information in (S201), namely it is judged that the visiting purpose cannot be specified by referring to the category and facility information only, the plan making unit 12 refers to the additional information in the database 14

(S202) in order to obtain information related to the itinerary of the traveler (S203). Based on the referred result, the travelling purpose is assumed (S204), and the steps of (S102) and subsequent steps shown in FIG. 2 are performed to prepare the itinerary. For example, when the reservation information shows that the traveler has made a reservation to play golf on the golf course, the purpose of visiting the golf course is assumed to be "golfing". Also, when the reservation information shows that the traveler has reserved a ticket to see a golf tournament, the visiting purpose is assumed to be "Game watching". If the additional information is not available, it is judged that the traveler is dropping by the golf course on business irrelevant to golf, and the traveler may be urged to enter detailed information. When it is not necessary to refer to the additional information in (S201), the visiting purpose is directly assumed (S204). Instead of the reservation information, the schedule of the traveler may be referred to.

Other additional information includes a supplementary item which is desired to be incorporated into the itinerary so that a traveler can travel smoothly. The supplementary item is recommended to be timely entered during travel in order to travel smoothly, to improve the itinerary. Therefore, the facility visiting purpose to be shown by the supplementary item is specifically determined.

For example, to enter facility information related to meals, it is desired to select the category "Eating spot" and then select one from the detailed items "Breakfast", "Lunch" and "Dinner" contained in the category. However, it is not desirable to provide detailed categories because the selection of a category requires time and labor and the operation takes a long time. To make the category entry simple, a broad category, for example, "Eating spot" is entered, and the visiting purpose is assumed with reference to the category and the supplementary item. In this case, the supplementary item is an item concerning meals, and appropriate facilities on the traveling route are shown when they appropriate. For example, 8:30 a.m. to 9:00 a.m. are shown for breakfast, 12:30 p.m. to 1:30 p.m. for lunch or 7:30 p.m. to 8:00 p.m. for dinner, and facilities on the travelling route where the traveler can arrive at the shown time are presented. By incorporating the pertinent facilities into the itinerary, smooth travel plans can be achieved.

First, a traveler selects the category "Sightseeing spot" or "Leisure facilities" to specify particular facilities and also selects the category "Eating spot" to specify desired facilities (restaurant, eating house, or coffee shop). Meanwhile, the plan making unit 12 retrieves recommended visiting times for facilities other than the eating facilities to prepare a time schedule. Then, it is judged whether or not a meal is necessary as a supplementary item to travel smoothly in accordance with the prepared time schedule. When a meal is necessary as the supplementary item, the eating facility list presented as the supplementary item is compared with the eating facilities originally entered by the traveler, and if the list has any facilities which match with those entered by the traveler, the facilities entered by the traveler are applied to the location suitable to have breakfast, lunch or dinner. In other words, even when it is not known whether the restaurant-visiting purpose is to have breakfast, lunch or dinner at the time of entering the category, the visiting purpose can be assumed by referring to the supplementary item. On the other hand, if the eating facility list presented as the supplementary item does not have any facilities which match with the eating facilities originally entered by the traveler, it is judged that the traveler will visit the eating facilities for a purpose other than having a meal, for example, having an appointment to see someone, and the traveler is urged to enter information to specify the visiting purpose.

Thus, by referring to the additional information, the categories are not required to be subdivided any more than necessary. Also, the input operation is simplified, an appropriate visiting purpose can be assumed, and recommended visiting times can be presented. The supplementary item may be "Resting spot" or "Staying spot" in addition to the "Eating spot".

Embodiment 4

Figure 6:
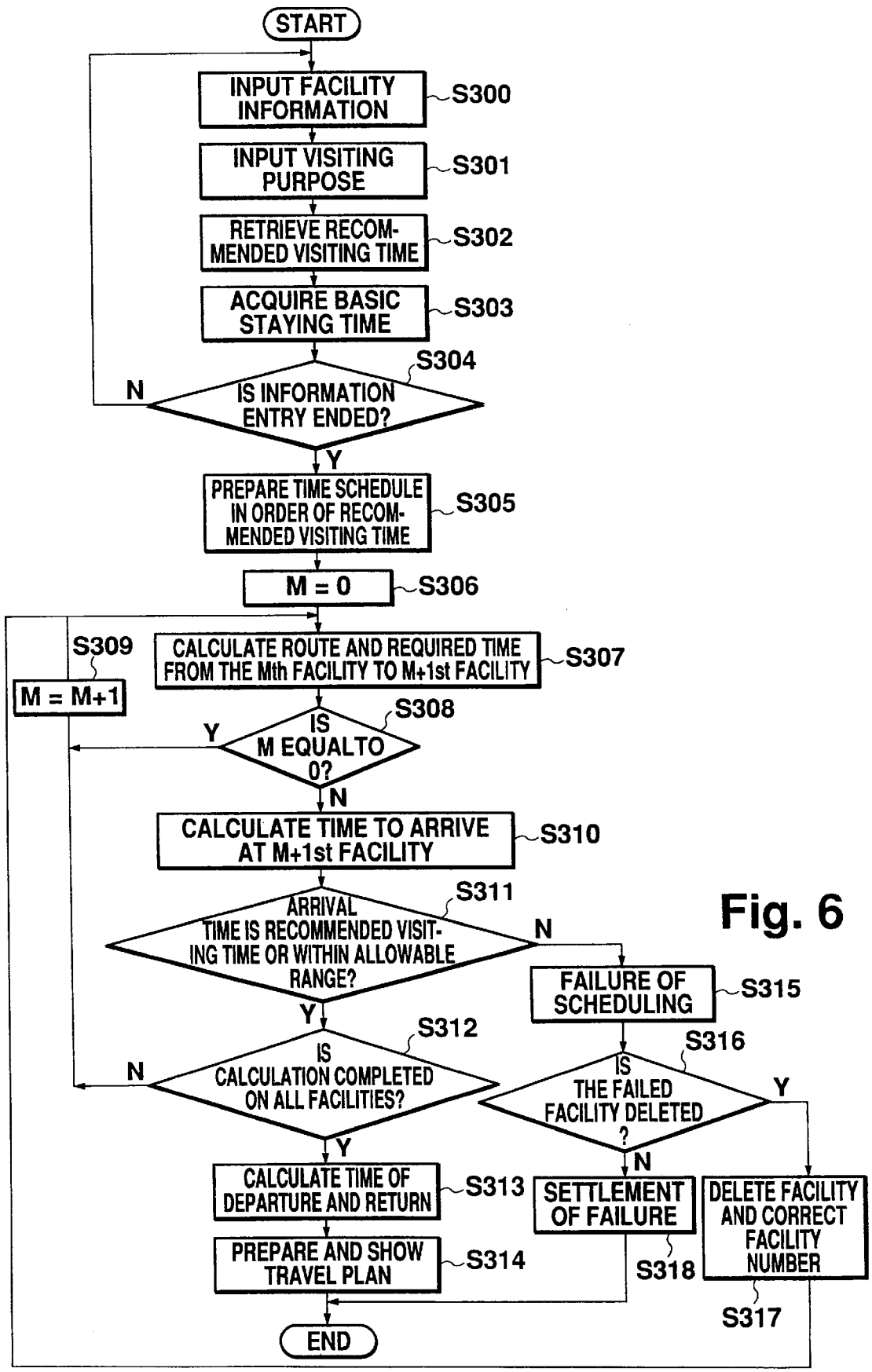
FIG. 6 is a flowchart for explaining the process of making an itinerary with a plurality of desired facilities to be visited in the embodiments according to the invention.

Referring to the flowchart of FIG. 6, a description will be provided of a case where a traveler desires to visit a plurality of facilities.

In the same way as the flowchart of FIG. 2 related to the visit to the facilities at a single location, facility information (including a traveling date, a place of departure, and a place of return) is entered for respective facilities a traveler wants to visit (S300), and a visiting purpose is entered (S301) through the input unit 18. Then, the plan making unit 12 retrieves recommended visiting time (S302) and acquires basic staying time (S303). The steps (S300) to (S303) are repeated until all desired facilities have been entered (S304). When desired facilities have been input through the input unit 18, the plan making unit 12 arranges the facilities in order of the retrieved recommended visiting time to prepare a time schedule (S305). In other words, the facilities are rearranged regardless of the entered order, and the facility visiting order is decided. Then, a variable M indicating the place of departure and the visiting facility number is defined, and "M=0" indicating the place of departure is set (S306). Hereinafter, first visiting facilities are given a facility number M=1, second visiting facilities are given a facility number M=2, and third and following are indicated in the same way.

Then, the plan making unit 12 calculates the optimum route and required time for traveling from the Mth facility to the M+1st facility on the basis of map information, distance information, traffic jam tendency information and the like kept in the database 14 (S307). Specifically, when M=0, this item is calculated for the first facility from the place of departure, and when M=3, the optimum route and required time are calculated on the distance from the third facility to the fourth facility. Then, it is judged whether or not M=0, namely whether or not a route or the like has been calculated covering from the place of departure to the first facility (S308). When M=0, to calculate the route and required time to the next facility, "1" is added to the value M (S309), and the optimum route and required time are calculated for the distance between the first facility and the second facility in the same way as above (S307). Since M is not 0 except for the first time, (S308) is omitted. Then, based on the basic staying time obtained in (S303) and the required time or the like obtained in (S307), the time of arrival at the M+1st facility (the second facility in this case) is calculated (S310).

Based on the stay ending time in the first facility, it is judged whether or not the traveler can arrive at the second facility at the recommended visiting time or within an allowable margin (S311). Since the recommended visiting time is originally defined to be time when the traveler desired to arrive at the pertinent facilities so that the traveler can use the facility to full effect, the recommended visiting time for most cases can have an allowable range of plus or minus several minutes, or several ten minutes. For example, the recommended visiting time can be 2:00 p.m. ±15 minutes or the like. When the traveler can arrive at the second facility at the recommended visiting time or within an allowable margin, it is judged whether or not the routes and required time to all input facilities have been calculated (S312), and if not completed, the process returns to (S309), and calculation for the third and subsequent facilities is conducted in the same way as described above.

When it is judged in (S312) that the routes and required time to all facilities have been calculated, the time of departure is calculated based on the arrival time at the first facility, and the time of return is calculated based on the time of leaving from the last facility (S313). At this time, the route and required time from the last visiting facility to the place of return are calculated. Further, the itinerary from the start to the return is prepared and presented (S314). The itinerary may be shown on the display or printed on paper in the same way described above.

On the other hand, when it is judged in (S311) that the traveler cannot arrive at the second facility at the recommended visiting time or within an allowable margin, it is judged that the schedule preparation has failed (S315). The facility at which the traveler cannot arrive at the recommended visiting time is deleted from the itinerary, and it is judged whether or not the itinerary should be prepared continuously (S316). For deletion, the pertinent facilities are deleted from the time schedule prepared in (S305), and the facility numbers in the time schedule prepared in (S305) are corrected (S317). In other words, the facility numbers in the time schedule are provided assuming that the deleted facilities were originally not in the schedule. The process of (S307) and following is also performed.

When the subject facilities are not deleted in (S316), namely the traveler wants to visit the facilities at the recommended time, it is shown on the display 16 or the like, or announced in voice that the itinerary desired by the traveler cannot be prepared in the current state, and the traveler is urged to review the visiting facilities (S318). Then, the itinerary making process is terminated.

Thus, even when the traveler wants to visit a plurality of facilities, an itinerary according to which the traveler can visit the facilities at an appropriate time can be prepared.

Embodiment 5

Figure 7:
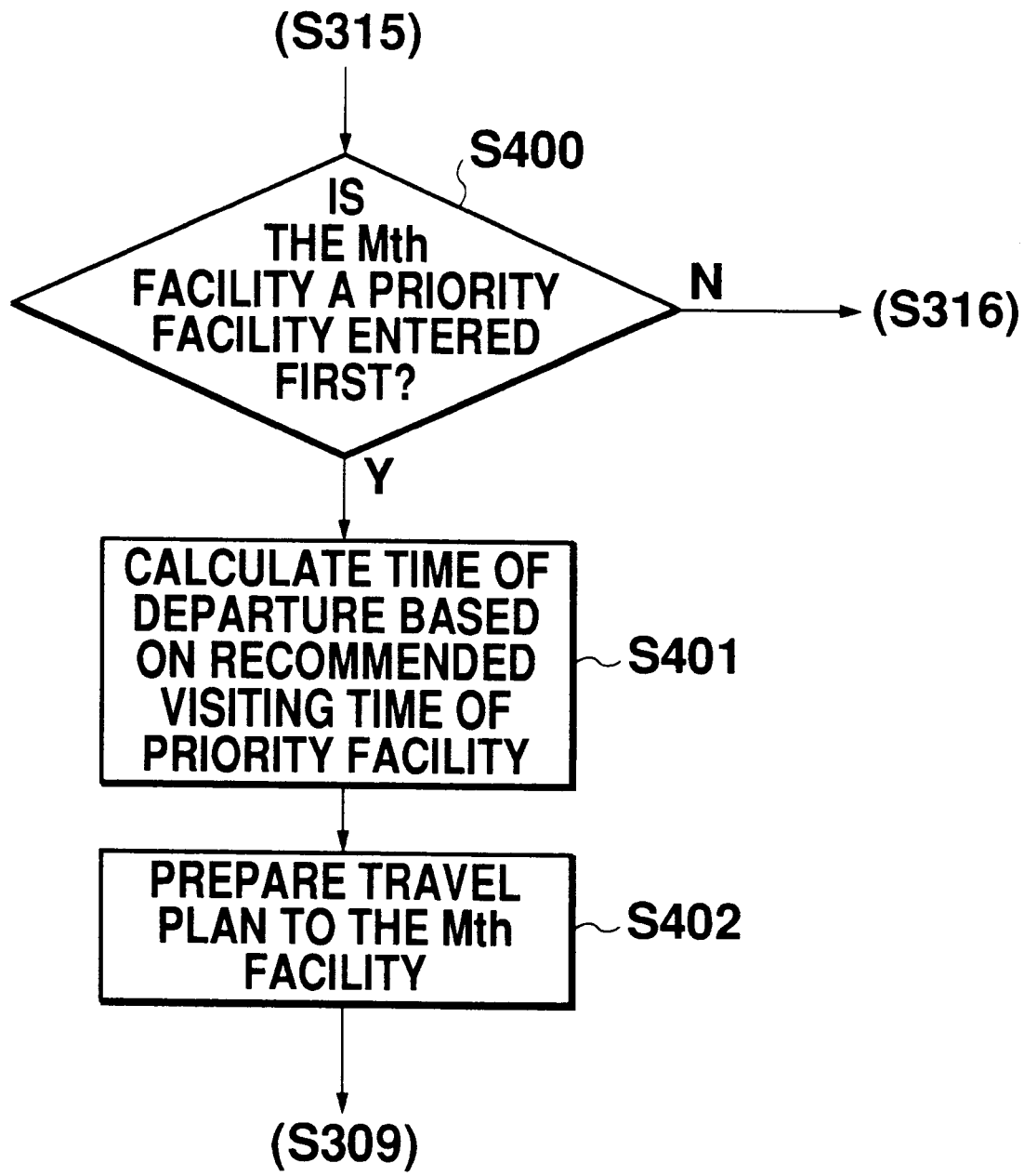
FIG. 7 is a partial flowchart for explaining the process of making a prioritized itinerary according to a recommended time of visiting the facilities in the embodiments according to the invention.

With reference to the flowchart of FIG. 6, description was made of the case that when the traveler wanted to visit a plurality of facilities and the schedule preparation was judged as a failure by comparing the arrival time with the recommended visiting time, the itinerary was prepared with the pertinent facilities deleted. In such a case, it is possible that the facilities (facilities with high visiting priority) which the traveler wants to visit most may be deleted. Therefore, the flowchart of FIG. 7 shows an example of preparing an itinerary with emphasis on facilities having high priority, so that a traveler can visit such facilities at an optimum time. The facilities with high priority are determined to be those which are entered first when facilities are entered.

When the failure of schedule preparation is indicated in (S315), it is judged in the flowchart of FIG. 6 whether or not the subject facilities are the priority facilities entered first (S400). If the subject facilities are not the priority facilities entered first, (S316) and subsequent steps in the flowchart of FIG. 6 are performed, and the facilities are deleted. On the other hand, if the subject facilities are judged to be the priority facilities entered first in (S400), the time of departure is calculated based on the recommended visiting time to the priority facilities (S401). In other words, based on the basic staying time at the facilities M–1, M–2, . . . and the time required for traveling thereto, the time of departure is calculated by calculating back the time sequentially. Further, based on the calculated time of departure, the itinerary for the priority facilities is prepared and decided (S402). After deciding the itinerary for the priority facilities, the process returns to (S309), where the arrival time and the like are calculated for the priority facilities and other facilities. When the time of departure is calculated based on the recommended visiting time to the priority facilities, the time of return only is calculated in (S313) of the flowchart shown in FIG. 6.

Thus, by preparing the itinerary based on the recommended visiting time to the priority facilities, the traveler can visit most timely the facilities where the traveler wants to visit most. When the itinerary is prepared based on the recommended visiting time to the priority facilities, the recommended visiting time to the facilities before the priority visiting facilities is not always observed.

Embodiment 6

Description will be given for a case of preparing a more fulfilling itinerary. As described above, when the recommended visiting time is retrieved based on the facility information entered by the traveler to prepare an itinerary, there may be free time between, for example, the facility to be visited second and the facility to be visited third. In such a case, the facilities related to the second and third visiting facilities are presented as the recommended visiting facilities and their recommended visiting time is also presented, so that a more fulfilled itinerary can be prepared. The recommended visiting facilities presented are those previously stored in the database 14 (see FIG. 1). They are scenic spots, popular spots or the like located near the entered visiting facility or on the route to the facility.

Figure 8:
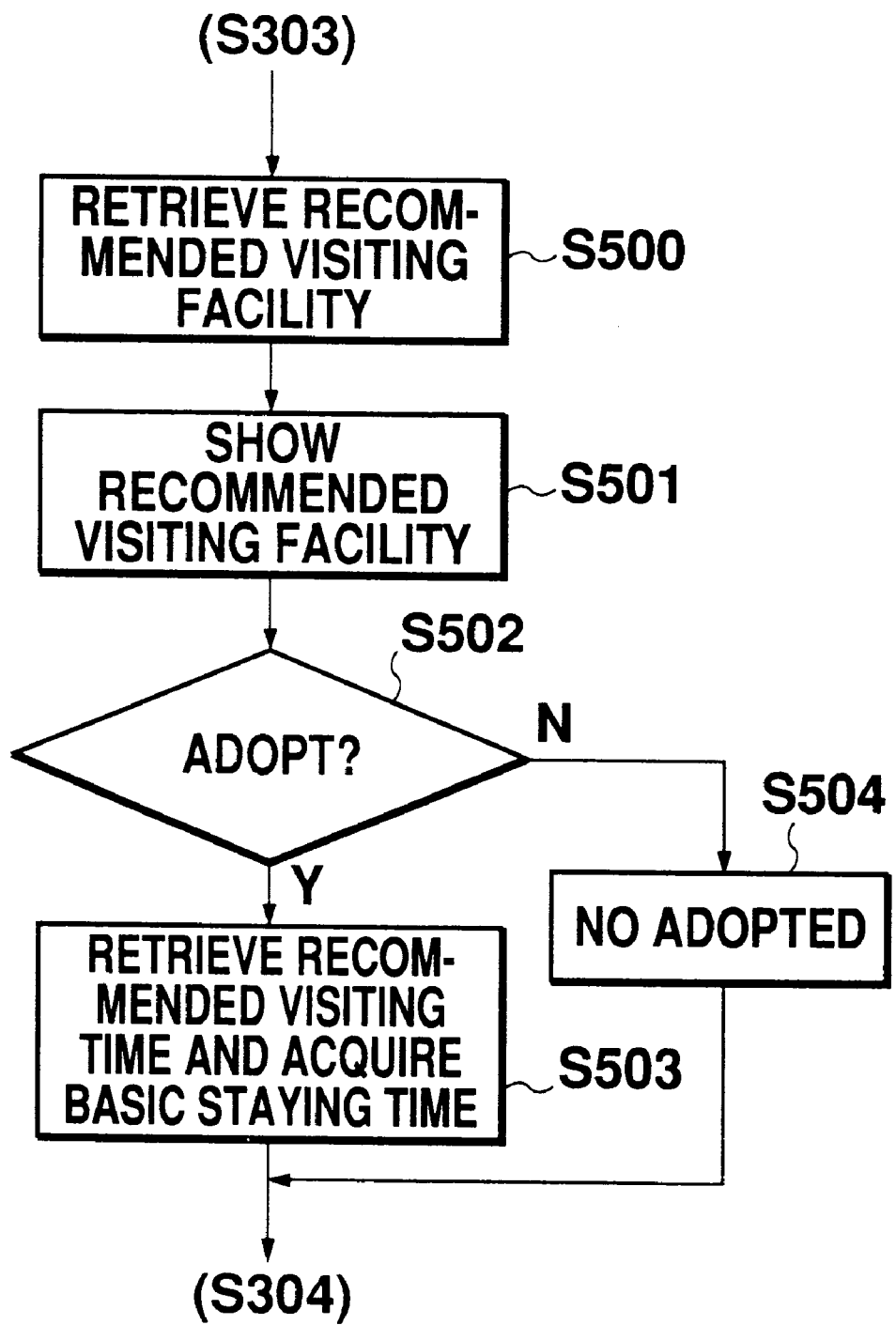
FIG. 8 is a partial flowchart for explaining the process of making an itinerary by showing recommended facilities to be visited in the embodiments according to the invention.

Besides, the recommended visiting facilities may be connected to the prescribed facility based on the past visiting record of a traveler. For example, by arranging "resting facilities after sporting facilities" or "a night view spot after dinner", a well fulfilled itinerary incorporating the traveler's behavior pattern can be prepared. FIG. 8 shows a partial flowchart for showing the process of presenting recommended visiting facilities. Upon completing the basic staying time in facilities from the entered facility information in the flowchart of FIG. 6 (S303), the plan making unit 12 refers to the database 14 (S500) and presents the corresponding recommended visiting facilities (S501). The traveler judges whether or not he or she wants to incorporate the recommended visiting facilities presented into the itinerary (S502). If adopted, the plan making unit 12 retrieves the recommended visiting time to the recommended visiting facilities and also obtains the basic staying time (S503), then performs the same process (S304) when the facility information is entered by the traveler. On the other hand, if the recommended visiting facilities presented in (S502) are not adopted, the recommended visiting facilities are deleted as being rejected (S504), and the process of (S304) is performed. The recommended visiting facilities may be added or changed by the traveler as necessary.

Thus, by presenting the recommended visiting facilities and the corresponding recommended visiting time, a more fulfilling itinerary can be prepared easily.

In the above-described respective embodiments, recommendation information on the recommended visiting facilities and the like is predetermined with reference to the past travel data and the like, but the content of recommendation information may be changed according to the adoption or rejection entered by the traveler through the input unit 18 (see FIG. 1).

Figure 9:
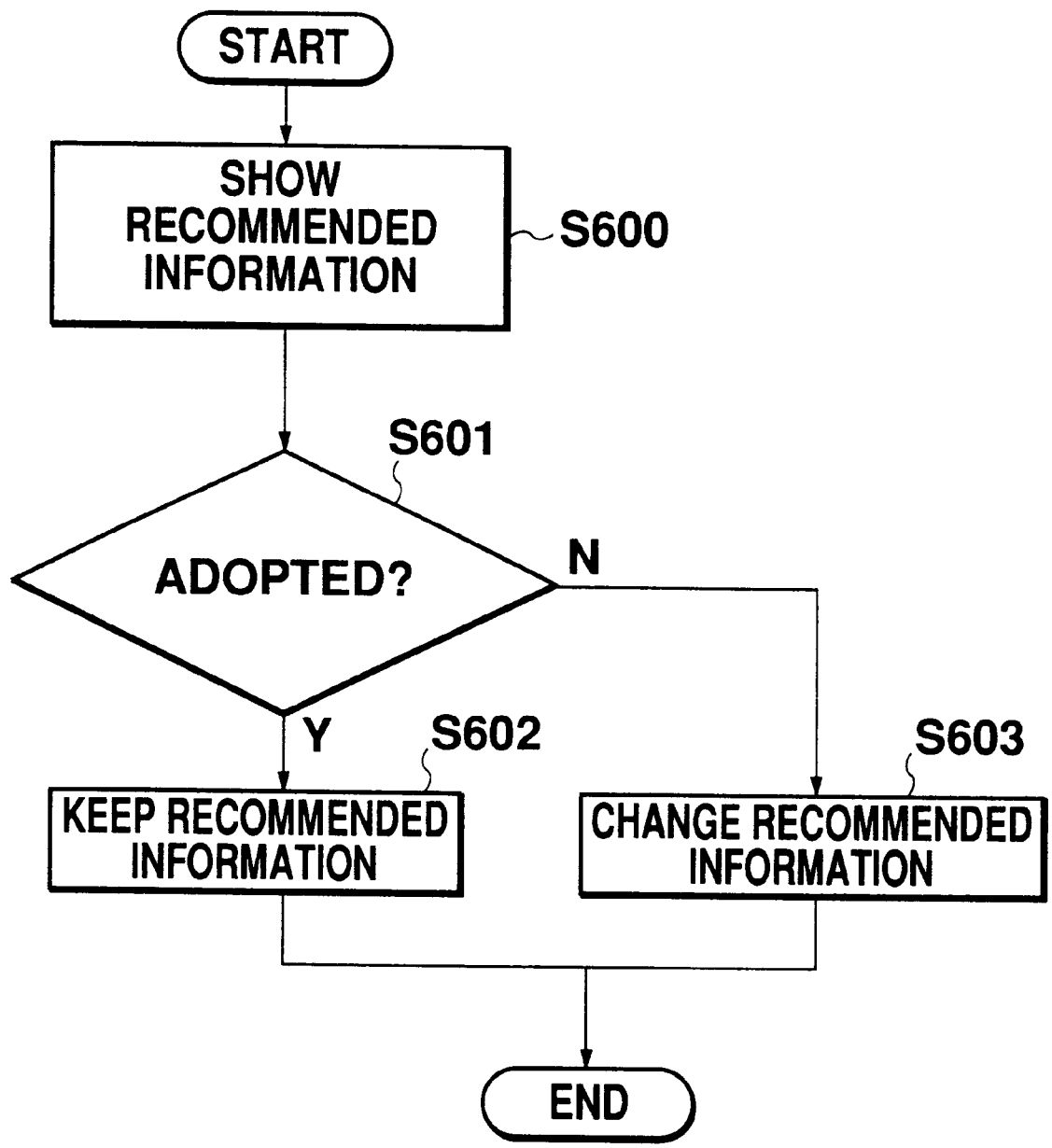
FIG. 9 is a flowchart for explaining the process of changing recommended information depending on whether or not the recommended information was adopted in the embodiments according to the invention.

For example, when recommendation information on the recommended visiting facilities or the like is presented (S600) as shown in FIG. 9, the traveler judges whether or not the presented information is to be adopted (S601). When the recommendation information is adopted, the plan making unit 12 judges the present information as information suitable for the traveler and keeps the recommendation information (S602). On the other hand, if it is not adopted, namely the presented facilities are not adopted based on the information on "resting facilities after sporting facilities", the plan making unit 12 judges that the presented information is different from the traveler's travel pattern, and changes the recommendation information according to the result selected by the traveler.

Thus, by renewing the recommendation information as required, information desired by the traveler can be provided quickly, and an itinerary for timely visiting desired facilities can be prepared easily. In addition to the recommended visiting facilities, this recommendation information may include the recommended visiting time which can be changed depending on whether the traveler selects to adopt or the recommendation. Further, the recommendation information is changed depending on a single judgment of adoption or rejection as shown in FIG. 9, but the recommendation information may be changed when the same judgment of adoption or rejection is made a prescribed number of times (e.g., three times).

The itinerary making system according to the embodiments may be configured as a portable terminal or an in-car navigation system.

Figure 10:
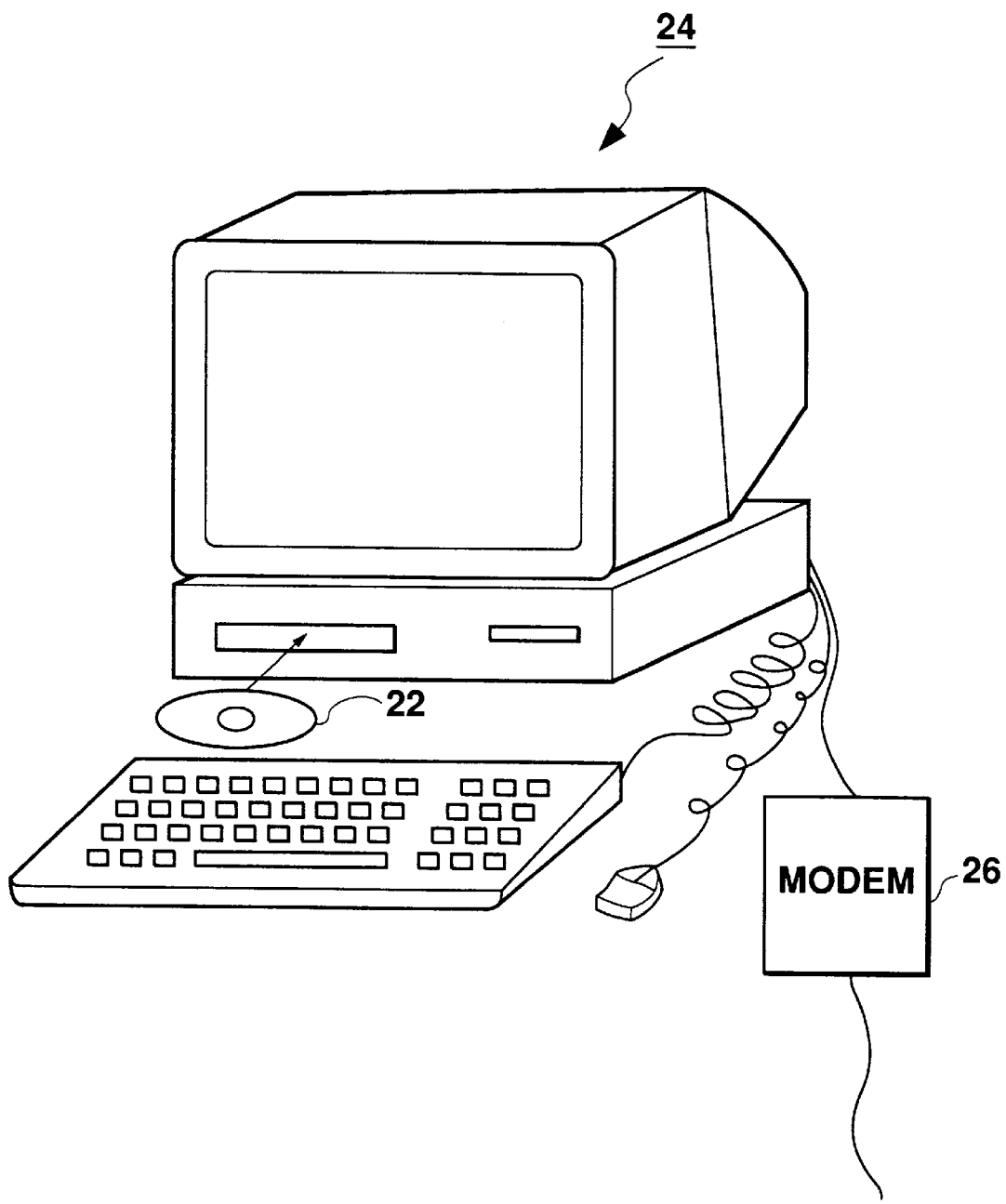
FIG. 10 is an explanatory view for showing a case where a computer is operated by using a storage device which stores a program for executing an itinerary preparing operation.

Further, the program for executing an itinerary making process (see FIGS. 2, 5, 6, 7, 8 and 9) by the itinerary making system according to the above embodiments may be stored in a storage device 22 shown in FIG. 10. The program stored in the storage device is then installed into a computer 24 or the like of FIG. 10, so that the itinerary making system can be established. The storage device includes, for example, a magnetic disc, magnetic tape, RAM, flash memory, optical disc, DVD, and so on as well as a CD-ROM, and a floppy disc. The storage device also includes a RAM which stores the program received from an outside service center via a communication line and is used to perform an itinerary preparing operation.

As shown in FIG. 10, the information can be obtained from the external database 14 shown in FIG. 1 by simply connecting the computer 24 to a modem 26. In the case where a CD-ROM which already stores in information in database 14 is used, the itinerary preparing operation may be executed without using the modem 26.

As described above, an itinerary is prepared according to the optimum recommended visiting time for a visiting purpose in this invention, so that the itinerary according to which facilities can be timely visited can be prepared by a simple inputting operation.

While there have been described what are at present considered to be preferred embodiments of the invention, it is to be understood that various modifications may be made thereto, and it is intended that the appended claims cover all such modifications as fall within the true spirit and scope of the invention.

What is claimed is:

1. A computerized itinerary making system for preparing an itinerary according to inputted information comprising:

input means for entering facility information including purposes of visiting facilities, time storage means for storing a recommended visiting time for each said purpose of visiting said facilities, retrieval means for retrieving the recommended visiting time which corresponds to the entered visiting purpose, and plan making means for preparing said itinerary according to said retrieved recommended visiting time.

2. A computerized itinerary making system for preparing an itinerary according to inputted information comprising:

category storage means for storing facilities in a form classified according to categories, input means for entering facility information containing the categories of the facilities, assuming means for assuming a visiting purpose according to the category entered, time storage means for storing a recommended visiting time corresponding to the visiting purpose, retrieval means for retrieving the recommended visiting time which corresponds to the assumed visiting purpose, and plan making means for preparing said itinerary according to said retrieved recommended visiting time.

3. The computerized itinerary making system according to claim 2, wherein said plan making means, when plural items of said facility information are entered, determines an order of visiting the facilities according to said recommended visiting time retrieved for each item of facility information and prepares said itinerary based on said order.

4. The computerized itinerary making system according to claim 3 further comprising priority determining means for determining priority of visiting said facilities to be visited according to an entered order of said facilities, wherein said plan making means prepares an itinerary on the basis of facilities with high priority.

5. The computerized itinerary making system according to claim 2 further comprising information acquiring means for obtaining predetermined additional information, wherein said purpose assuming means assumes a visiting purpose with reference to said additional information.

6. The computerized itinerary making system according to claim 5, wherein said additional information is reservation information for facilities to be visited for future use.

7. The computerized itinerary making system according to claim 2 further comprising pertinent facility storage means for storing recommended visiting facilities related to said visiting facilities and recommended visiting times thereof, wherein said plan making means prepares said itinerary which includes the recommended visiting facilities corresponding to the entered visiting facility information.

8. The computerized itinerary making system according to claim 2 further comprising an output unit for outputting the prepared itinerary.

9. The computerized itinerary making system according to claim 2 further comprising:

adoption/rejection input means for entering adoption or rejection of the prepared itinerary, and recommendation changing means for changing the recommended visiting time provided at the time of preparing said itinerary according to adoption or rejection.

10. A computerized itinerary making system for preparing an itinerary according to inputted information comprising:

input means for entering facility information including purposes of visiting facilities, time storage means for storing a recommended visiting time for each said purpose of visiting said facilities, retrieval means for retrieving the recommended visiting time which corresponds to the entered visiting purpose, and plan making means for preparing said itinerary according to said retrieved recommended visiting time, wherein said plan making means, when plural items of said facility information are entered, determines an order of visiting the facilities according to said recommended visiting time retrieved for each item of said facility information and prepares said itinerary based on said order.

11. The computerized itinerary making system according to claim 10 further comprising priority determining means for determining priority of visiting said facilities to be visited according to an entered order of said facilities, wherein said plan making means prepares an itinerary on the basis of facilities with high priority.

12. A computerized itinerary making system for preparing an itinerary according to inputted information comprising:

input means for entering facility information including purposes of visiting facilities, time storage means for storing a recommended visiting time for each said purpose of visiting said facilities, retrieval means for retrieving the recommended visiting time which corresponds to the entered visiting purpose, plan making means for preparing said itinerary according to said retrieved recommended visiting time, and pertinent facility storage means for storing recommended visiting facilities related to said visiting facilities and recommended visiting times thereof, wherein said plan making means prepares said itinerary which includes the recommended visiting facilities corresponding to the entered visiting facility information.

13. A computerized itinerary making system for preparing an itinerary according to inputted information comprising:

input means for entering facility information including purposes of visiting facilities, time storage means for storing a recommended visiting time for each said purpose of visiting said facilities, retrieval means for retrieving the recommended visiting time which corresponds to the entered visiting purpose, plan making means for preparing said itinerary according to said retrieved recommended visiting time, and an output unit for outputting the prepared itinerary.

14. A computerized itinerary making system for preparing an itinerary according to inputted information comprising:

input means for entering facility information including purposes of visiting facilities, time storage means for storing a recommended visiting time for each said purpose of visiting said facilities, retrieval means for retrieving the recommended visiting time which corresponds to the entered visiting purpose, plan making means for preparing said itinerary according to said retrieved recommended visiting time, and adoption/rejection input means for entering adoption or rejection of the prepared itinerary, and recommendation changing means for changing the recommended visiting time provided at the time of preparing said itinerary according to adoption or rejection.

15. A computer program storage device readable by a machine, tangibly embodying a program of instructions executed by the machine to perform method steps for making an itinerary, said method steps comprising steps of:

1) receiving facility information including a facility and a visiting purpose regarding the facility;

2) retrieving a recommended visiting time corresponding to the visiting purpose from a database which stores a recommended visiting time for each said visiting purpose of the facility; and 3) making said itinerary for visiting the facility according to the retrieved recommended visiting time.

16. A computer program storage device readable by a machine, tangibly embodying a program of instructions executed by the machine to perform method steps for making an itinerary, said method steps comprising steps of:

1) receiving facility information including a facility and a category designated to the facility;

2) assuming a visiting purpose of the facility according to the category;

3) retrieving a recommended visiting time corresponding to the visiting purpose from a database which stores a recommended visiting time for each said visiting purpose of the facility; and 4) making said itinerary for visiting the facility according to the retrieved recommended visiting time.

17. A computer program storage device readable by a machine, tangibly embodying a program of instructions executed by the machine to perform method steps for making an itinerary, said method steps comprising steps of:

1) receiving facility information including a facility and a visiting purpose regarding the facility;

2) retrieving a recommended visiting time corresponding to the visiting purpose from a database which stores a recommended visiting time for each said visiting purpose of the facility;

3) making said itinerary for visiting the facility according to the retrieved recommended visiting time;

4) receiving an adoption or rejection of the itinerary; and 5) changing the recommended visiting time provided at the time of preparing said itinerary according to said adoption or rejection.

* * * * *